(12) United States Patent
Inbar et al.

(10) Patent No.: US 11,537,292 B2
(45) Date of Patent: Dec. 27, 2022

(54) METHODS AND APPARATUS FOR ENHANCING UBER RATE FOR STORAGE DEVICES

(71) Applicant: Western Digital Technologies, Inc., San Jose, CA (US)

(72) Inventors: Karin Inbar, Ramat Hasharon (IL); Avichay Haim Hodes, Kfar Ben-Nun (IL); Einat Lev, Rehovot (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/910,886

(22) Filed: Jun. 24, 2020

(65) Prior Publication Data

US 2021/0405886 A1  Dec. 30, 2021

(51) Int. Cl.
*G06F 3/06* (2006.01)
*G06F 11/07* (2006.01)

(52) U.S. Cl.
CPC ............ *G06F 3/0616* (2013.01); *G06F 3/064* (2013.01); *G06F 3/0619* (2013.01); *G06F 3/0634* (2013.01); *G06F 3/0653* (2013.01); *G06F 3/0673* (2013.01); *G06F 11/076* (2013.01); *G06F 11/0772* (2013.01)

(58) Field of Classification Search
CPC .... G06F 3/0616; G06F 3/0634; G06F 3/0619; G06F 3/0673; G06F 11/0772; G06F 3/0653; G06F 11/076; G06F 3/064; G06F 11/008
USPC ........................................................ 714/704
See application file for complete search history.

(56) References Cited

U.S. PATENT DOCUMENTS

| 6,038,680 | A  | * | 3/2000  | Olarig ................. G06F 11/1044 714/6.1 |
| 6,630,754 | B1 | * | 10/2003 | Pippin ................. G06F 11/3093 374/173 |
| 7,139,942 | B2 |   | 11/2006 | Subramanian et al. |
| 7,162,676 | B2 | * | 1/2007  | Coleman ............ H03M 13/353 714/704 |
| 8,122,294 | B2 | * | 2/2012  | Childs ................. G06F 11/2221 714/42 |
| 8,151,137 | B2 |   | 4/2012  | McKean et al. |
| 8,489,966 | B2 |   | 7/2013  | Schuette et al. |
| 9,009,565 | B1 | * | 4/2015  | Northcott ............ G06F 11/1012 714/763 |
| 11,212,447 | B1 | * | 12/2021 | Le .......................... G03B 13/36 |

(Continued)

OTHER PUBLICATIONS

Marc Brakels, Forward Error Correction and failure rates on Aurora high-speed links, 2017, University of Twente, S1105000, p. 23. (Year: 2017).*

(Continued)

*Primary Examiner* — Albert Decady
*Assistant Examiner* — Enam Ahmed
(74) *Attorney, Agent, or Firm* — Patterson & Sheridan, LLP; Steven H. VerSteeg

(57) ABSTRACT

A method and apparatus for enhancing reliability of a data storage device. The storage device controller is configured to convert a typical UBER-type event to an MTBF (FFR) event by converting a data error event into a drive functional failure. In this context, the converted error is not counted as an UBER type event for purposes of determining the reliability of the storage device.

20 Claims, 3 Drawing Sheets

(56) References Cited

U.S. PATENT DOCUMENTS

| | | | | |
|---|---|---|---|---|
| 2001/0052093 | A1* | 12/2001 | Oshima | G11C 29/56 714/719 |
| 2008/0072120 | A1* | 3/2008 | Radke | B32B 25/08 714/768 |
| 2009/0240366 | A1* | 9/2009 | Kaushal | G06N 5/04 700/110 |
| 2010/0017650 | A1* | 1/2010 | Chin | G06F 11/108 710/22 |
| 2013/0232289 | A1* | 9/2013 | Zhong | G06F 11/1008 711/102 |
| 2014/0269090 | A1* | 9/2014 | Flynn | G11C 16/3495 365/185.24 |
| 2015/0089310 | A1* | 3/2015 | Motwani | G06F 11/0772 714/763 |
| 2015/0248922 | A1* | 9/2015 | Hyun | G11C 16/16 365/189.011 |
| 2016/0283308 | A1* | 9/2016 | Earhart | G11C 7/1063 |
| 2017/0110199 | A1* | 4/2017 | Li | G11C 29/44 |
| 2017/0168716 | A1* | 6/2017 | Shaharabany | G06F 11/1068 |
| 2019/0361606 | A1* | 11/2019 | Goker | H03M 13/2918 |
| 2020/0310914 | A1* | 10/2020 | Shatsky | G06F 11/1088 |

OTHER PUBLICATIONS

Justin J Meza, Large Scale Studies of Memory, Storage, and Network Failures in a Modern Data Center, 2018, ProQuest, p. 114-121. (Year: 2018).*

Todd A. Marquart, Ph.D., Solid-State-Drive Qualification and Reliability Strategy, 2015 IIRW Final Report, 978-1-4673-7396-8, IEEE 2015, pp. 3-6.

Justin Meza et al., A Large-Scale Study of Flash Memory Failures in the Field, SIGMETRICS'15, Jun. 15-19, 2015, Portland, OR, USA. ACM 978-1-4503-3486-0/15/06, http://dx.doi.org/10.1145/2745844.2745848, pp. 177-190.

Edwards "4 causes of SSD failure and how to deal with them," 2019; Retrieved from the Internet: <URL: https://searchstoragetechtarget.com/tip/4-causes-of-SSD-failure-and-how-to-deal-with-them> , Mar. 19, 2019, 2 pages.

International Search Report and the Written Opinion for International Application No. PCT/US2020/066426, dated Mar. 4, 2021, 12 pages.

Meza "Large Scale Studies of Memory, Storage, and Network Failures in a Modern Data Center," arXiv preprint arXiv: 1901.03401; Retrieved from the Internet:<URL: <https://arxiv.org/pdf/1901.03401.pdf>>, Jan. 1, 2019, 180 pages.

Subedi "Exploration of erasure-coded storage systems for high performance, reliability, and inter-operability," Aug. 31, 2016, Virginia Commonwealth University, Theses and Dissertations, Retrieved from the Internet:<URL: <https://scholarscompass.vcu.edu/cgi/viewcontent.cgi?referer=https://www.google com/&httpsredir=1&article=5480&context=etd>>, 131 pages.

* cited by examiner

300

METHODS AND APPARATUS FOR ENHANCING UBER RATE FOR STORAGE DEVICES

BACKGROUND OF THE DISCLOSURE

Field of the Disclosure

Embodiments of the present disclosure generally relate to reliability of data storage devices, and more particularly to enhancing uncorrectable bit error rates in data storage devices.

Description of the Related Art

Reliability of data storage devices may be measured in uncorrectable bit error rate (UBER) and/or mean time between failure (MTBF) rates (sometimes referred to as functional failure rate, or FFR). In prior approaches sector or block (e.g., a grouping of sectors based on attributes of the data storage device) data read errors has been measured as an UBER type errors, while MTBF type failures are attributed to a storage device that fails to function properly in a manner that is more severe than a data rate error (e.g., a data read error), such as write failures or failures in write circuitry.

The threshold values for determining reliability of a data storage device are typically determined by a standard. For example, the current JEDEC standard provides that fewer than 3% FFR type events, and fewer than $10^{-16}$ UBER type events as thresholds. For device designs that exceed these requirements, substantial additional design and test time must be provided to ensure reliability.

Due to the ever-increasing size of data storage devices, meeting reliability requirements for UBER type events becomes increasingly difficult. While a sector error of a data storage device failing to read properly now and again doesn't count against UBER requirements in a substantial way over the useful life of a data storage device, a block level error which contains thousands of sectors in large data storage devices, may count a substantial 'hit' against UBER requirements. Block level events are relatively rare as compared to individual sector events.

On the other hand, MTBF or FFR type events are relatively rare in the useful life of a data storage device. However, even though the impact of a block level event on the reliability of a device may directly impact the functioning of a data storage device as a whole, it is 'counted' against a device's UBER count, causing significant design resources to be dedicated to solving these relatively rare events.

What is needed are systems and methods to provide for block level data read errors to be provided as MTBF (or FFR) type of events.

SUMMARY OF THE DISCLOSURE

The present disclosure generally relates to enhancing reliability of a data storage device. The storage device controller is configured to convert a typical UBER-type event to an MTBF (FFR) event by converting a data error event into a drive functional failure. In this context, the converted error is not counted as an UBER type event for purposes of determining the reliability of the storage device.

In one embodiment, a data storage device includes one or more memory devices and a controller coupled to the one or more memory devices. The controller is configured to execute one or more instructions held in the one or more memory devices to perform a method for improving reliability of a storage device that includes detecting a block failure of a storage device and entering an assertion mode by the storage device.

In another embodiment, a data storage device includes one or more memory devices and a controller coupled to the one or more memory devices. The controller is configured to execute one or more instructions held in the one or more memory devices to perform a method for enhancing reliability of a data storage device. The method includes receiving an interrupt indicating a data failure event at a data storage device, determining that the data failure event is a block failure, and updating the data storage device to indicate that the data failure event is a mean time between failure (MTBF) event.

In another embodiment, a data storage device includes one or more memory means and a controller means coupled to the one or more memory means. The controller is configured to execute one or more instructions held in the one or more memory means to perform a method for enhancing reliability of a data storage device. The method includes receiving an interrupt indicating a data failure event at a data storage device, determining that the data failure event is a block failure, and updating the data storage device to indicate that the data failure event is a mean time between failure (MTBF) event.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

A method and apparatus for enhancing reliability of a data storage device. The storage device controller is configured to convert a typical UBER-type event to an MTBF (FFR) event by converting a data error event into a drive functional failure. In this context, the converted error is not counted as an UBER type event for purposes of determining the reliability of the storage device.

Figure 1:
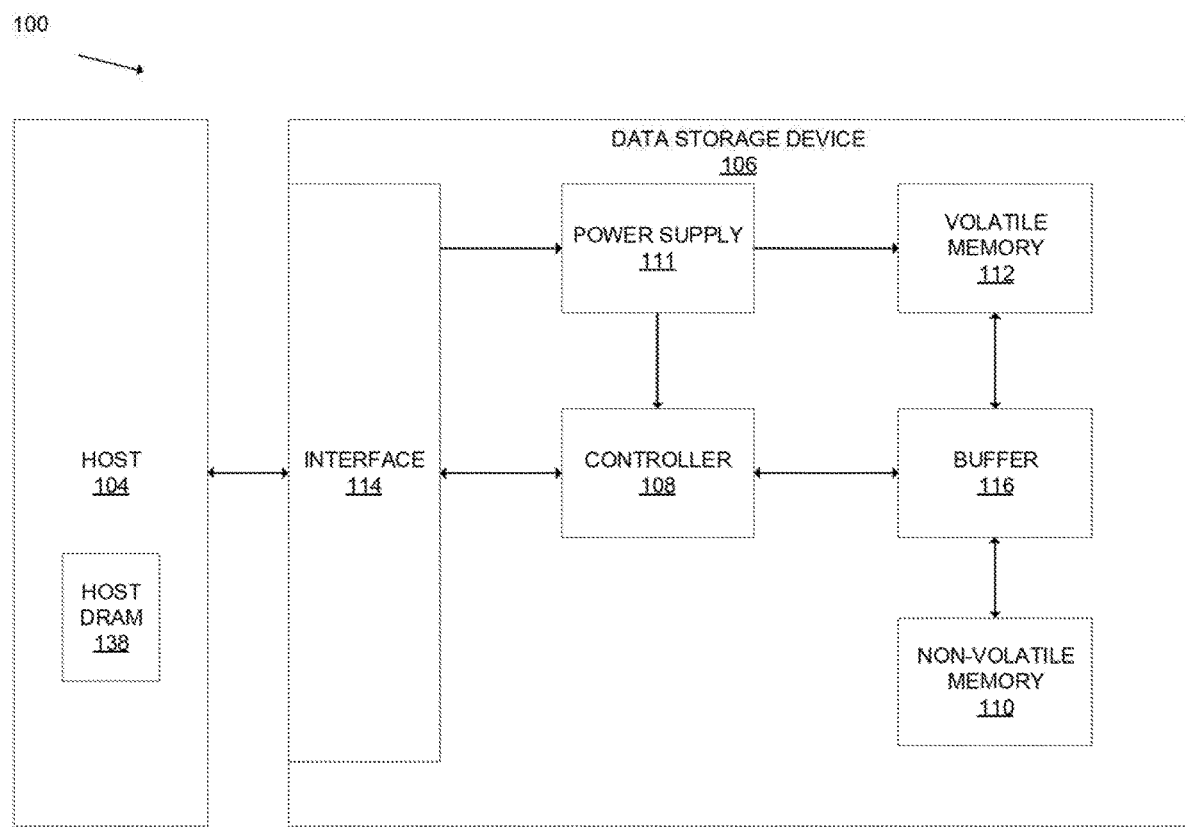
FIG. 1 is a schematic block diagram illustrating a storage system having a storage device that may function as a storage device for a host device, in accordance with one or more techniques of this disclosure.

FIG. 1 is a schematic block diagram illustrating a storage system 100 in which data storage device 106 may function as a storage device for a host device 104, in accordance with one or more techniques of this disclosure. For instance, the host device 104 may utilize non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The storage system 100 includes a host device 104 which may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The data storage device 106 includes a controller 108, NVM 110, a power supply 111, volatile memory 112, an interface 114, and a write buffer 116. In some examples, the data storage device 106 may include additional components not shown in FIG. 1 for sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The data storage device 106 includes NVM 110, which may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. Flash memory devices may include NAND or NOR based flash memory devices, and may store data based on a charge contained in a floating gate of a transistor for each flash memory cell. In NAND flash memory devices, the flash memory device may be divided into a plurality of blocks which may be divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), or quad level cell (QLC). The controller 108 may write data to and read data from NAND flash memory devices at the page level and the block level.

The data storage device 106 includes a power supply 111, which may provide power to one or more components of the data storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
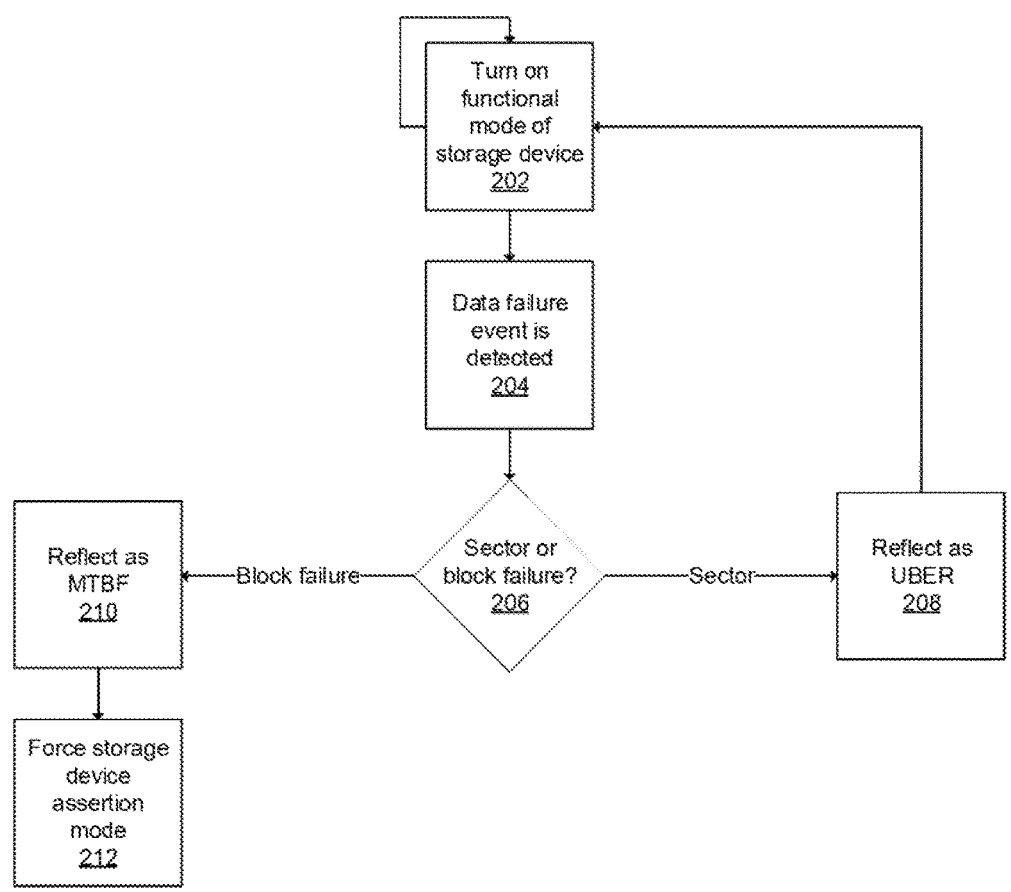
FIG. 2 is a flow diagram for enhancing reliability of a data storage device, according to disclosed embodiments.

FIG. 2 is a flow diagram 200 for enhancing reliability of a data storage device, according to disclosed embodiments. The data storage device may be the data storage device 106 of FIG. 1. The reliability of the data storage device may be described as the functional failure rate (FFR). The functional failure rate (FFR), which refers to the mean time between failures (MTBF), and the uncorrectable bit error rate (UBER). In the descriptions herein, the FFR may be referred to as MTBF for exemplary purposes.

The MTBF is the predicted elapsed time between inherent failures of the storage device during normal operation. The MTBF may be calculated as an arithmetic mean time between failures of a storage device or a plurality of storage devices. For example, if three of the same storage devices with the same operational load are initiated at the same time, the MTBF for a fourth same storage device may be the average of the failure time of the three previous same storage devices. Thus, the higher the MTBF, the longer the storage device is expected to operate. The MTBF value may be set by the host (e.g., the customer) or pre-set as a base value. When the threshold value of the MTBF is reached, then the storage device may be deemed inoperable. For example, the MTBF value of the storage device may be about 20,000 operating hours. At about 19,999 hours, 59 minutes, and 59 seconds, the storage device has not reached the MTBF value. However, when about 1 second passes, then the device is at the threshold value or about 20,000 operating hours. The storage device may be deemed as inoperable at that time. Furthermore, an annualized failure rate (AFR) is an estimated probability that the storage device may fail within a full year of use. The AFR is a relationship between the MTBF and the hours that a plurality of storage devices are operated per year.

The number of bit errors is the number of received bits of a data stream over a communication channel (e.g., stored data in the NVM) that have been altered due to noise, interference, distortion, or bit synchronization errors. The bit error rate (BER) is the number of bit errors per unit time. Therefore, the UBER is the threshold value of the number of bit errors per unit time. For example, the UBER for a storage device may be about 1,000 bit errors per unit time. The storage device may be operating at about 999 bit errors per unit time. Since the UBER value has not been reached, the storage device may continue to operate. However, at about 1,000 bit errors per unit time, the UBER value has been reached and the storage device may be deemed as inoperable at that time. A large BER may lead to a faster degradation of the storage device capabilities. The capabilities may be a decrease of the available storage in the NVM due to non-accessible memory locations, such as corrupted blocks, pages, or dies.

In one embodiment, when the bit error rate is acceptable, but the threshold value of the MTBF has been reached, the storage device may be deemed inoperable due reaching the threshold value of the MTBF. In another embodiment, when the MTBF has not been reached, but the storage device has a BER that is at the threshold value or above, the storage device may be deemed inoperable due to the UBER constraint.

At block 202, the functional mode of the storage device is turned on. The storage device referenced may be the data storage device 106 of FIG. 1. Because the MTBF may have a larger threshold value than the threshold value of the UBER, the UBER value may be reached before reaching the MTBF value of the storage device. The functional mode of the storage device is a mode that allows the controller, such as the controller 108 of FIG. 1, to convert typical UBER type events into FFR (or MTBF) type events.

At block 204, a data failure event is detected when the storage device operations, such as a write to or a read from a location in the NVM, such as the NVM 110 of FIG. 1, is interrupted by a data failure, such as a corrupted bit. In embodiments, the data failure event is a write event, a read event, or a combination of write and read events. At block 206, the controller determines if the data failure is to a sector (e.g., a single bit of a word line of a single sector, or in some embodiments, multiple sectors) or to a block. Though a block is example in the current embodiment, other sizes of NVM locations, such as a page, a die, and the like, may be applicable to the techniques disclosed herein.

If the data failure event is to a single sector, then the data failure event is reflected as an increase in BER in the direction of the UBER value at block 208. For example, the UBER threshold may be $1 \times 10^{-16}$ bit errors per unit time. The controller returns to the functional mode at block 202 and waits to detect another data failure event at block 204.

However, if the data failure event is to a block, then at block 210, the controller reflects the data failure event as MTBF, such that the data failure event does not increase the BER. Rather, the BER maintains at the current value, such that the BER does not increase to towards the UBER threshold. If the block failure was reflected as a BER, then the storage device UBER may increase from a level of about $1\times10^{-16}$ bit errors per unit time to a level of about $1\times10^{-15}$ bit errors per unit time. Although the data failure here is described in the context of a block, in various embodiments other units of data storage in which a write (or even read) error occurs may be reflected as MTBR. For example, a storage space comprising multiple sectors, one or more dies, one or more planes, or any other unit of measure of a portion of memory of a data storage device may benefit from the techniques disclosed herein.

At block 212, the controller forces the storage device to enter an assertion mode. When the storage device enters the assertion mode, a functional error mode is declared, which may only effect the FFR rather than the UBER.

Figure 3:
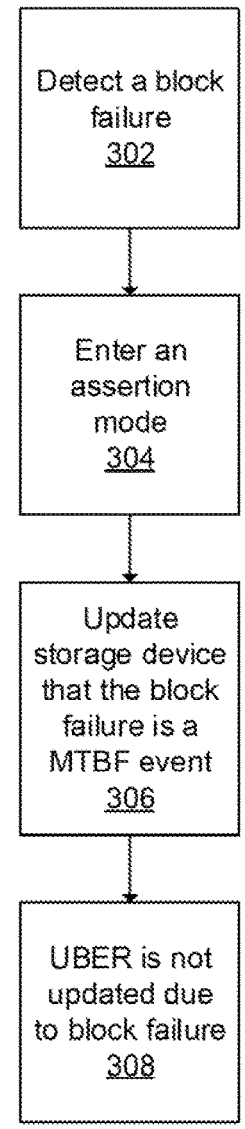
FIG. 3 is a method for enhancing reliability of a data storage device, according to disclosed embodiments.

FIG. 3 is a method 300 for enhancing reliability of a data storage device, according to disclosed embodiments. At block 302, the controller, such as the controller 108 of FIG. 1, of a storage device, such as the data storage device 106 of FIG. 1, detects a block failure. Though a block is example in the current embodiment, other sizes of NVM locations, such as a page, a die, and the like, may be applicable.

At block 304, the controller places the storage device into an assertion mode, such as in block 212 of FIG. 2. The controller updates the storage device to reflect that the block failure is a MTBF event and not a UBER event at block 306. The MTBF threshold may be larger than the UBER threshold, such that a MTBF event does not have as large of an impact as an UBER event does on the storage device. At block 308, the UBER is not updated due to the block because of the assertion mode entered at block 304.

By configuring the controller of a storage device to treat block level failures as a MTBF event (or a FFR event), the storage device UBER may be maintained, while preserving an acceptable MTBF (or FFR) rate. Furthermore, by treating block level failures as a MTBF event (or a FFR event), a large amount of work may be eliminated for enhanced firmware solutions to recover NAND failures.

In one embodiment, a data storage device including one or more memory devices and a controller coupled to the one or more memory devices. The controller is configured to execute one or more instructions held in the one or more memory devices to perform a method for improving reliability of a storage device that includes detecting a block failure of a storage device and entering an assertion mode by the storage device.

The instructions further include updating the storage device to reflect the block failure as a mean time between failure (MTBF) event. The instructions further include where an unrecoverable bit error rate (UBER) of the storage device is not updated as a result of the block failure. The instructions further include detecting a sector failure of the storage device and updating the UBER of the storage device to reflect the sector failure.

In another embodiment, a data storage device including one or more memory devices and a controller coupled to the one or more memory devices. The controller is configured to execute one or more instructions held in the one or more memory devices to perform a method for enhancing reliability of a data storage device. The method includes receiving an interrupt indicating a data failure event at a data storage device, determining that the data failure event is a block failure, and updating the data storage device to indicate that the data failure event is a mean time between failure (MTBF) event.

The instructions further include forcing the data storage device to enter an assertion mode. The instructions further include wherein an unrecoverable bit error (UBER) of the data storage device is not update as result of the data failure event. The instructions further include detecting a second interrupt indicating a second data failure event at the data storage device, determining that the second data failure event is a sector failure, and updating the data storage device to indicate that the second data failure event is an UBER event.

In another embodiment, a data storage device including one or more memory means and a controller means coupled to the one or more memory means. The controller is configured to execute one or more instructions held in the one or more memory means to perform a method for enhancing reliability of a data storage device. The method includes receiving an interrupt indicating a data failure event at a data storage device, determining that the data failure event is a block failure, and updating the data storage device to indicate that the data failure event is a mean time between failure (MTBF) event.

The instructions further include forcing the data storage device to enter an assertion mode. The instructions further include wherein an unrecoverable bit error (UBER) of the data storage device is not update as result of the data failure event. The instructions further include detecting a second interrupt indicating a second data failure event at the data storage device, determining that the second data failure event is a sector failure, and updating the data storage device to indicate that the second data failure event is an UBER event.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   one or more non-transitory memory devices; and
   a controller coupled to the one or more non-transitory memory devices, wherein the controller is configured to execute one or more instructions held in the one or more non-transitory memory devices to perform a method for improving reliability of the data storage device, comprising:
   detecting whether a block failure of a block of the data storage device has occurred or a sector failure of the block of the data storage device has occurred, wherein the block failure is associated with an entirety of the block, and wherein the sector failure is associated with less than the entirety of the block; and
   entering an assertion mode by the data storage device, wherein the assertion mode comprises:
   converting an uncorrectable bit error (UBER) type data failure event to a mean time between failure (MTBF) event when the block failure has occurred, wherein the converting increases an MTBF value associated with the block while maintaining an UBER value associated with the block; and
   reflecting the UBER type data failure event as the UBER type data failure event when the sector failure has occurred, wherein the reflecting increases the UBER value while maintaining the MTBF value associated with the block.

2. The data storage device of claim 1, wherein the instructions further comprise updating the storage device to reflect the block failure as a mean time between failure (MTBF) event.

3. The data storage device of claim 2, wherein the detected block failure of the storage device is a read failure.

4. The data storage device of claim 2, wherein an uncorrectable bit error rate (UBER) of the storage device is not updated as a result of the block failure.

5. The data storage device of claim 4, wherein the instructions further comprise:
    detecting a sector failure of the storage device; and
    updating the UBER of the storage device to reflect the sector failure.

6. The data storage device of claim 5, wherein the detected sector failure of the storage device is a read failure.

7. The data storage device of claim 6, wherein the instructions further comprise causing the data storage device to a functional mode.

8. A data storage device, comprising:
    one or more non-transitory memory devices; and
    a controller coupled to the one or more non-transitory memory devices, wherein the controller is configured to execute one or more instructions held in the one or more non-transitory memory devices to perform a method for enhancing reliability of the data storage device, the method comprising:
        receiving an interrupt indicating that a data failure event has occurred;
        determining that the data failure event is either a block failure of a block of the data storage device or a sector failure of the block of the data storage device, wherein the block failure is associated with an entirety of the block, and wherein the sector failure is associated with less than the entirety of the block; and
        either:
            updating the data storage device to indicate that the data failure event is a mean time between failure (MTBF) event when the data failure event is the block failure, wherein the updating comprises converting an uncorrectable bit error (UBER) type data failure event to the MTBF event, and wherein the converting increases an MTBF value associated with the block while maintaining an UBER value associated with the block; or
            reflecting the data failure event as the UBER type data failure event when the data failure event is the sector failure, wherein the reflecting increases the UBER value while maintaining the MTBF value associated with the block.

9. The data storage device of claim 8, wherein the block failure is an uncorrectable bit error rate (UBER) type data failure event.

10. The data storage device of claim 8, wherein the instructions further comprise putting the data storage device to enter an assertion mode.

11. The data storage device of claim 10, wherein an UBER of the data storage device is not updated as result of the data failure event.

12. The data storage device of claim 11, the instructions further comprising:
    detecting a second interrupt indicating a second data failure event at the data storage device;
    determining that the second data failure event is a sector failure; and
    updating the data storage device to indicate that the second data failure event is an UBER event.

13. The data storage device of claim 12, wherein the second data failure event is a write event.

14. The data storage device of claim 12, the instructions further comprising placing the data storage device into a mode configured to reflect a block failure as an MTBF event.

15. A data storage device, comprising:
    one or more non-transitory memory means; and
    a controller means coupled to the one or more non-transitory memory means, wherein the controller means is configured to execute one or more instructions held in the one or more non-transitory memory means to perform a method for enhancing reliability of the data storage device, the method comprising:
        receiving an interrupt indicating that a data failure event has occurred;
        determining that the data failure event is a failure of at least one sector of a block of a non-transitory memory means of the one or more non-transitory memory means; and
        either:
            updating the data storage device to indicate that the data failure event is a mean time between failure (MTBF) event when the data failure event is a block failure, wherein a block failure is associated with an entirety of the block, wherein the updating comprises converting an uncorrectable bit error (UBER) type data failure event to the MTBF event, and wherein the converting increases an MTBF value of the block while maintaining an UBER value of the block; or
            reflecting the UBER type data failure event as the UBER type data failure event when a sector failure has occurred, wherein a sector failure is associated with less than the entirety of the block, and wherein the reflecting increases the UBER value while maintaining the MTBF value associated with the block.

16. The data storage device of claim 15, wherein the at least one sector is a block.

17. The data storage device of claim 16, wherein the method further comprises placing the data storage device into a functional error mode.

18. The data storage device of claim 17, wherein the data failure event is a read event.

19. The data storage device of claim 18, wherein the method further comprises receiving a sector data failure event.

20. The data storage device of claim 19, wherein the method further comprises updating the data storage device to reflect an uncorrectable bit error rate (UBER) event, and place the data storage device in a functional mode.

* * * * *